United States Patent
Kountz et al.

(10) Patent No.: US 6,530,240 B1
(45) Date of Patent: Mar. 11, 2003

(54) CONTROL METHOD FOR MIXED REFRIGERANT BASED NATURAL GAS LIQUEFIER

(75) Inventors: Kenneth J. Kountz, Palatine, IL (US); Patrick M. Bishop, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/013,243

(22) Filed: Dec. 10, 2001

(51) Int. Cl.[7] ............................. F25J 1/00; F25B 45/00
(52) U.S. Cl. ............................. 62/611; 62/149; 62/174
(58) Field of Search ........................... 62/611, 613, 603, 62/51.2, 149, 174

(56) References Cited

U.S. PATENT DOCUMENTS

| | | | |
|---|---|---|---|
| 3,204,422 A | * 9/1965 | Buller et al. | 62/192 |
| 3,238,737 A | * 3/1966 | Shrader et al. | 62/149 |
| 3,413,817 A | * 12/1968 | Kniel | 62/613 |
| 5,139,548 A | * 8/1992 | Liu et al. | 60/39.12 |
| 5,337,572 A | * 8/1994 | Longsworth | 62/114 |
| 5,372,013 A | * 12/1994 | Lau et al. | 62/174 |
| 5,724,832 A | * 3/1998 | Little et al. | 62/114 |
| 5,791,160 A | * 8/1998 | Mandler et al. | 62/611 |
| 6,295,833 B1 | * 10/2001 | Hoffart et al. | 62/613 |

* cited by examiner

Primary Examiner—William C. Doerrler
(74) Attorney, Agent, or Firm—Mark E. Fejer

(57) ABSTRACT

In a natural gas liquefaction system having a refrigerant storage circuit, a refrigerant circulation circuit in fluid communication with the refrigerant storage circuit, and a natural gas liquefaction circuit in thermal communication with the refrigerant circulation circuit, a method for liquefaction of natural gas in which pressure in the refrigerant circulation circuit is adjusted to below about 175 psig by exchange of refrigerant with the refrigerant storage circuit. A variable speed motor is started whereby operation of a compressor is initiated. The compressor is operated at full discharge capacity. Operation of an expansion valve is initiated whereby suction pressure at the suction pressure port of the compressor is maintained below about 30 psig and discharge pressure at the discharge pressure port of the compressor is maintained below about 350 psig. Refrigerant vapor is introduced from the refrigerant holding tank into the refrigerant circulation circuit until the suction pressure is reduced to below about 15 psig, after which flow of the refrigerant vapor from the refrigerant holding tank is terminated. Natural gas is then introduced into a natural gas liquefier, resulting in liquefaction of the natural gas.

5 Claims, 4 Drawing Sheets

's CONTROL METHOD FOR MIXED
REFRIGERANT BASED NATURAL GAS
LIQUEFIER

The U.S. Government has a paid-up license in this invention and the right in limited circumstances to require the patent owner to license others on reasonable terms as provided for by the terms of Contract No. DE-AC02-99CH10978 awarded by the U.S. Department of Energy.

BACKGROUND OF THE INVENTION

1. Field of the Invention

This invention relates to a method for controlling a mixed refrigerant based, natural gas liquefier system through its startup, run and shutdown phases of operation. More particularly, this invention relates to a method for controlling a mixed refrigerant based, natural gas liquefier system that utilizes a novel exchange of system refrigerant between the system and an external storage tank whereby the use of extremely high pressures in the compressor discharge employed in conventional systems is circumvented, thereby allowing for the use of low cost, mass produced, HVAC components in the system.

2. Description of Related Art

Cryogenic liquefiers are commercially available for many industrial applications, including the liquefaction of natural gas to produce liquefied natural gas (LNG). These liquefiers are exclusively custom-made, permanent plants of large capacity commanding premium prices that the current market cannot afford. To date, the natural gas vehicle market has not generated enough incentives to develop a lowcost liquefier. However, the developing market and technology for natural gas vehicles provide a new opportunity for considering LNG fueling concepts requiring lower liquefaction installed facility costs. The recent growth in LNG demonstration programs and dedicated LNG-fueled fleets has created a market demand for a small shop-assembled liquefier in the 1000–3000 gallon/day capacity range. This low cost technology is being made possible through the identification and implementation of new refrigerant mixtures, refrigerant cycles and low cost HVAC mass produced components.

However, the control of a mixed refrigerant based natural gas liquefier using low cost HVAC components presents special problems, particularly in the system startup mode of operation in order not to exceed the pressure and temperature requirements of those components.

SUMMARY OF THE INVENTION

Accordingly, it is one object of this invention to provide a method of system control for a natural gas liquefaction system which enables operation of the system within the requirements of low cost components.

This and other objects of this invention are addressed by a method for controlling a natural gas liquefaction system comprising a refrigerant storage means, a refrigerant circulation means in fluid communication with the refrigerant storage means, and a natural gas liquefaction means in thermal communication with the refrigerant circulation means. The refrigerant storage means comprises a refrigerant holding tank and a refrigerant solenoid valve wherein the refrigerant solenoid valve controls the flow of refrigerant between the refrigerant holding tank and the refrigerant circulation means. The refrigerant circulation means comprises an oil flooded screw compressor having a suction pressure port, a discharge pressure port and an internal solenoid valve connecting the suction pressure port and the discharge pressure port; a variable speed motor suitable for driving the compressor operably connected to the compressor and an oil separator having a discharge gas inlet in fluid communication with the discharge pressure port, a separated oil outlet in fluid communication with an oil inlet of the compressor, and a separated gas outlet. A high pressure heat exchanger is provided having a separated gas inlet in fluid communication with the separated gas outlet and the liquid refrigerant storage means. The natural gas liquefaction means comprises a multi-circuit heat exchanger having a natural gas liquefier circuit and a refrigerant circuit, an expansion valve disposed in the refrigerant circuit and a liquid natural gas tank in fluid communication with the refrigerant circuit.

The method of this invention controls a cycle of the system having a start phase, a run phase and a shutdown phase. In accordance with one embodiment of this invention, a start signal is initiated whereby the refrigerant solenoid valve is operated to provide an initial pressure in the refrigerant circulation means below about 175 psig. Operation of the variable speed motor is initiated whereby operation of the compressor is initiated. The internal solenoid valve is then energized whereby the compressor is operated at full discharge capacity. Operation of the expansion valve is then initiated whereby suction pressure at the suction pressure port is maintained below about 30 psig and discharge pressure at the discharge pressure port is maintained below about 350 psig. Refrigerant vapor from the refrigerant holding tank is then introduced into the refrigerant circulation means until the suction pressure is reduced to below about 15 psig after which flow of the refrigerant vapor from the refrigerant holding tank is terminated. Natural gas is then introduced into the natural gas liquefier, resulting in liquefaction of the natural gas.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 2:
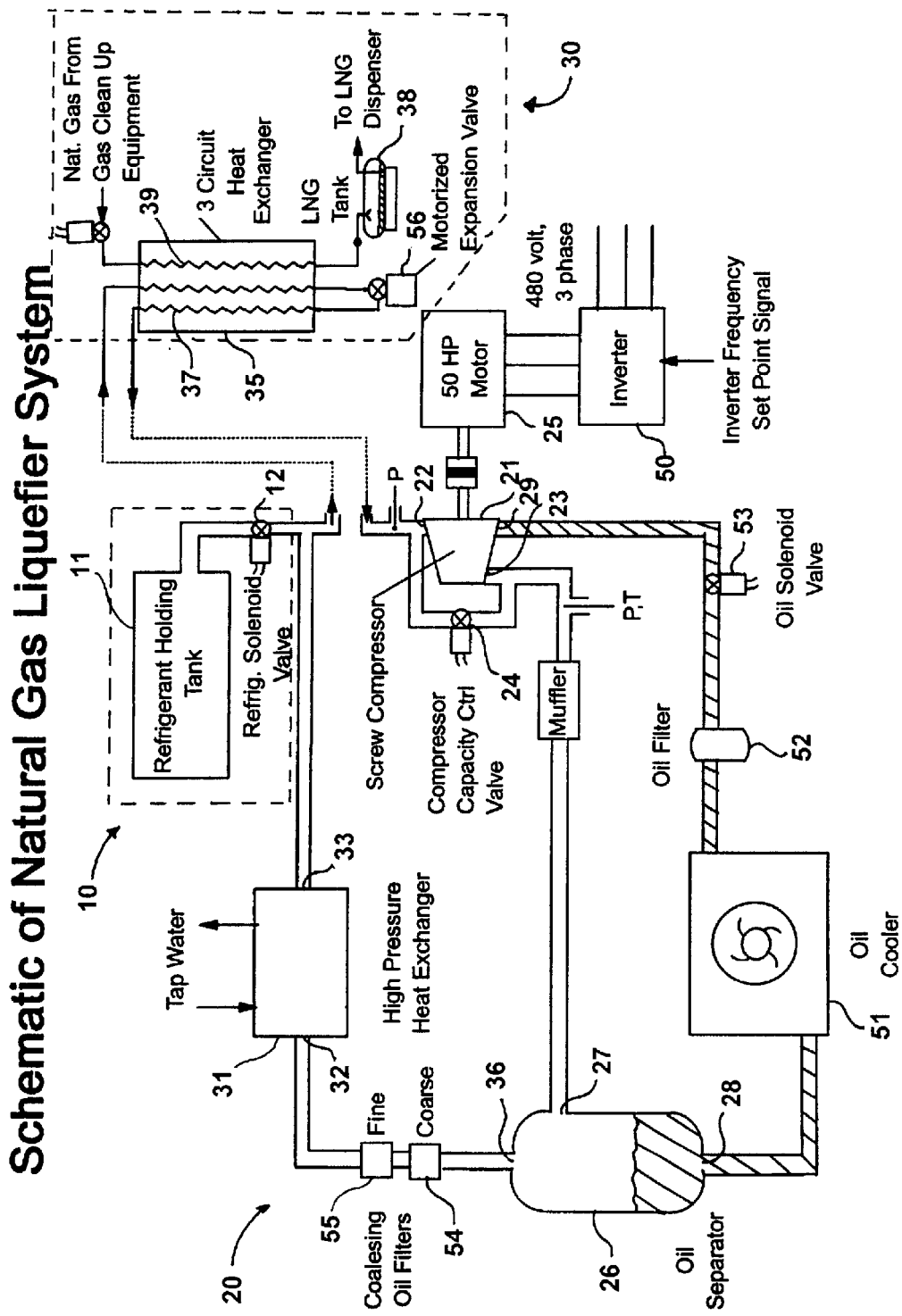
FIG. 2 is a schematic diagram of a natural gas liquefier system suitable for use in the method of this invention.

FIG. 2 shows a schematic diagram of a mixed refrigerant-based natural gas liquefier, the control of which is the subject of this invention. In describing the operation of the system, reference will be made to the components of an experimental natural gas liquefier designed and constructed by the inventors. In order to create the extremely cold temperatures in the refrigerant system described herein, a mixed refrigerant is utilized. At least one component of the mixed refrigerant has a boiling temperature below the condensing (or liquefying) temperature of natural gas. In accordance with one embodiment of this invention, the refrigerant mixture comprises nitrogen, methane, ethane, iso-butane and iso-pentane.

The mixed refrigerant-based natural gas liquefier system shown in FIG. 2 comprises a refrigerant storage means 10, a refrigerant circulation means 20 in fluid communication with the refrigerant storage means and a natural gas liquefaction means 30 in thermal communication with the refrigerant circulation means 20. The refrigerant storage means 10 comprises a refrigerant holding tank 11 and a refrigerant solenoid valve 12, which refrigerant solenoid valve controls flow of refrigerant between the refrigerant holding tank 11 and the refrigerant circulation means 20. The refrigerant circulation means 20 comprises an oil flooded screw compressor 21 having a suction pressure port 22, a discharge pressure port 23 and an internal solenoid valve 24, which internal solenoid valve 24 connects the suction pressure port 22 and the discharge pressure port 23.

A screw compressor is preferred for this application, as opposed to other fixed displacement compressors such as a reciprocating type, because the high degree of oil circulating in the unit tends to cool the compression process and allow for relatively low cost, low temperature, oil to be utilized. An additional feature of the screw compressor is its relatively long life, which is essential to the natural gas liquefier application, because the unit will be operated more or less continuously. Yet an additional characteristic of an oil flooded screw compressor in a natural gas liquefier system is the presence of a considerable quantity of oil in the discharge gas. This oil must be completely removed before the refrigerant gas enters the extremely low temperature portions of the system so as to prevent the oil from liquefying or possibly solidifying and plugging up the main system heat exchanger passages.

One way to insure that an adequate oil removal is possible with standard low cost components is to choose a compressor oil that has an extremely low vapor pressure. These types of oil have only minute quantities of oil present in vapor form in the refrigerant discharge gas, with most of the oil in aerosol form, which is relatively easy to remove by means of coalescing oil filtration methods. The oil chosen for the compressor in accordance with one preferred embodiment of this invention is a custom blended polyalphaolefin synthetic hydrocarbon fluid, Product Number CP-4601-150 available from CPE Engineering Services, Inc.

The refrigerant circulation means 20 further comprises a variable speed motor 25 suitable for driving the oil flooded screw compressor 21 operably connected to compressor 21. Disposed within refrigerant circulation means 20 is oil separator 26 having a discharge gas inlet 27 in fluid communication with the discharge pressure port 23, a separated oil outlet 28 in fluid communication with an oil inlet 29 of compressor 21, and a separated gas outlet 36. High pressure heat exchanger 31 comprises a separated gas inlet 32 which is in fluid communication with the separated gas outlet 36 of oil separator 26 and a liquid refrigerant outlet 33 in fluid communication with refrigerant storage means 10. Natural gas liquefaction means 30 comprises a multi-circuit heat exchanger 35 having a natural gas liquefier circuit 39 and a refrigerant circuit 37, an expansion valve 56 disposed in the refrigerant circuit 37 and a liquid natural gas tank 38 in fluid communication with the refrigerant circuit 37.

In operation, variable speed motor 25 is a 50 horsepower motor driven by an inverter 50, the setpoint frequency signal of which is used to determine the speed of variable speed motor 25. Inverter 50 is preferably capable of controlling the motor speed within the range of about 1000 rpm to about 3600 rpm, or within a frequency signal range of about 16.7 Hz to about 60 Hz. The frequency signal is one of the outputs of the control system logic shown in FIG. 1. Variable speed motor 25, in turn, drives oil flooded screw compressor 21. A suitable oil flooded screw compressor for use in this system is Model Number 057RQ039 available from the Carlyle Compressor, Division of Carrier Corporation, Syracuse, N.Y. The capacity of compressor 21 is controlled between two values through internal solenoid valve 24, which connects discharge pressure port 23 of compressor 21 to suction pressure port 22 of compressor 21, thereby controlling the net refrigerant flow to the system. Internal solenoid valve 24 is another output of the control shown in FIG. 1. This unloading feature allows for the startup of the system to be accomplished with only a small load on variable speed motor 25.

Referring to FIG. 2, the oil-rich compressor discharge gas flows first to an oil separator 26, also available from Carlyle Compressor, which separates most of the oil from the gas into a sump. The difference in the discharge and suction pressures of the compressor then drives the collected oil in the sump through an ambient-air-cooled oil cooler 51, through an oil filter 52 and then returns the oil to the compressor 21 through an oil solenoid valve 53. Upon system shut down, this normally closed solenoid valve is deactivated, thereby preventing an overflooding condition of oil in the screw compressor chambers, which could damage the unit upon restart.

From the oil separator 26, the discharge refrigerant gas still has some aerosol oil imbedded in it, which is removed by means of two stages of coalescing oil filtration components 54, 55. The first stage filtration component has a coarse coalescing oil filter element 54 (Parker Model HN6S-I ODSJ available from Finite Filter in Oxford, Mich.), and the second filtration component contains a fine filter 55 (Parker Model HN6S-4DSJ available from Finite Filter). The coarse filter removes 90% of oil aerosols in the 0.35–0.60 micron range, and the fine filter removes 99.995% of the oil aerosols remaining after the coarse filter. Solenoid valves (not shown) are connected between the sumps of these oil filters and the compressor. These valves are operated for 30-second periods, each 24 hours of operation, to return the collected oil in the filter sumps to the compressor sump.

After the oil filters 54, 55, the relatively hot compressor discharge gas, now essentially oil free, passes to a high pressure heat exchanger 31, which may be cooled by any suitable coolant. In accordance with one embodiment of this invention, the coolant is water. In commercial applications of the liquefier, the cooling medium may be water from a cooling tower, or ambient air. If the compressor discharge gas is cooled by water, a control over a solenoid water valve should be added to the system control outputs indicated on FIG. 3. If cooled by ambient air, a control over the heat exchanger fan should be added to the outputs on FIG. 3. The cooled (approximately 100° F.) refrigerant gas then passes to the high pressure inlet of the main, three-circuited plate-fin exchanger 35. Such a heat exchanger is available from Altec Corporation located in LaCrosse, Wis. The heat exchanger 35 contains separate passages for high-pressure refrigerant, low-pressure refrigerant, and the natural gas to be liquefied.

The refrigerant holding tank 11, shown in FIG. 2, together with its associated solenoid valve 12, plays an important part in the start up of the system, and its method of operation is discussed in detail hereinbelow.

In the heat exchanger 35, the high-pressure refrigerant gas is condensed into a liquid by means of the cooling action of the boiling low-pressure refrigerant, which in turn is created by expanding the high pressure refrigerant over a motorized expansion valve 56. A cryogenic expansion valve suitable for use in this system is Model 708 MV available from Jordan Valve, Division of Richards Industries, Inc. located in Cincinnati, Ohio. The position of the valve is controlled by the control logic shown in FIG. 1, during both system pulldown and during long term operation of the liquefier. The low-pressure refrigerant in the heat exchanger provides the heat sink for both the condensation of the high-pressure refrigerant, and the liquefaction of the natural gas, flowing in separate passageways in the heat exchanger.

Natural gas, from gas clean up equipment, which removes carbon dioxide, water, and other undesirable impurities from the gas, enters the heat exchanger 35 at its top, at about 30 psig. The natural gas is cooled in the heat exchanger 35 and leaves the unit as a liquid, which in turn enters an LNG storage tank 38, for use in an LNG dispenser, when the liquefier is used in a vehicle fueling application.

Figure 3:
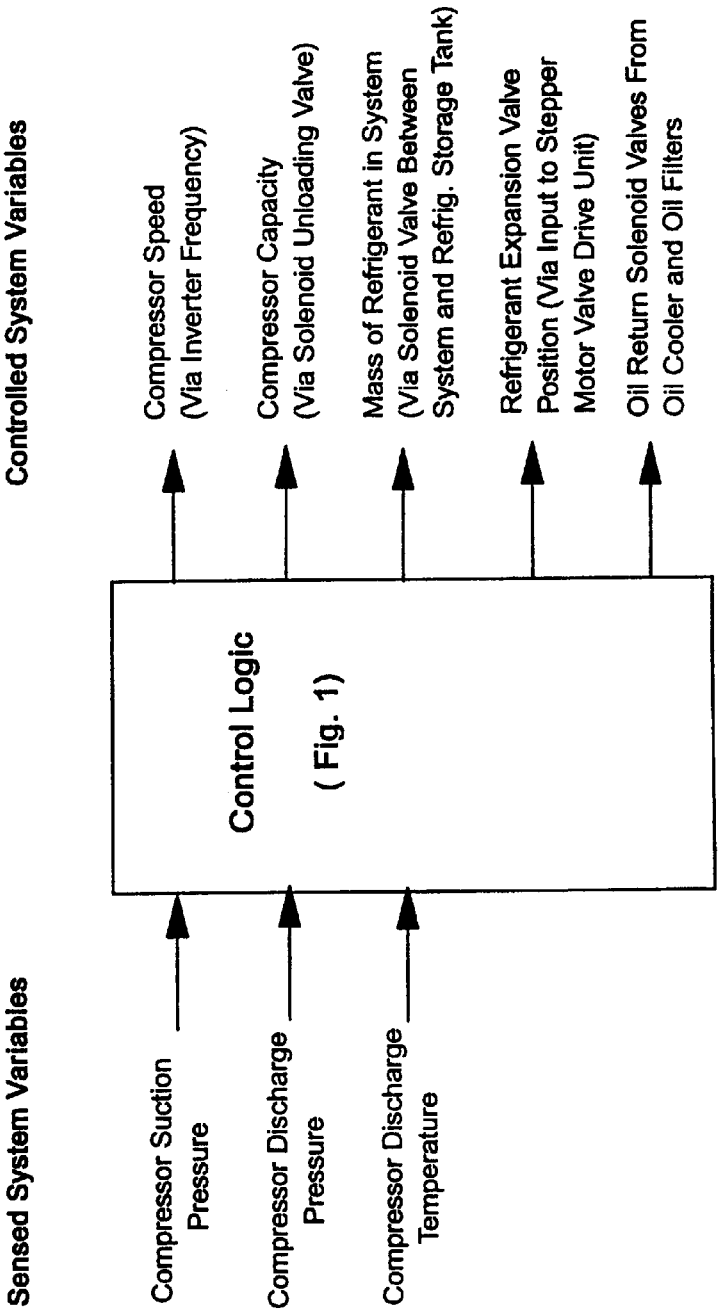
FIG. 3 is a diagram showing the system input and output variables in accordance with the method of this invention.

As shown in FIG. 3, the system controlled variables are 1) compressor speed (via electric motor drive inverter frequency), 2) compressor capacity (via an internal compressor solenoid valve connecting discharge to suction), 3) expansion valve position (via a stepper motor driven cryogenic valve), 4) system refrigerant capacity (via a solenoid valve between the refrigerant system and an external 5.5 cu. ft. gas storage cylinder), and 5) oil solenoid valves between the oil cooler, and oil filters, and the compressor oil sump. The signals to these controlled variables may be generated by data acquisition and control computer through I/O components and relays. The sensed variables are 1) compressor suction pressure, 2) compressor discharge pressure, and 3) compressor discharge temperature. Electronic transducers may be used to measure system refrigerant pressures, while a thermocouple may be used to measure the compressor discharge temperature.

The software algorithm, described in the following section, has been implemented in PARAGON software, which both controls the system, through electronic interface I/O components, and acquires data on system performance. The techniques disclosed insure that the system safely starts, runs, and stops without exceeding the pressure limitations of the low cost HVAC components in the system, namely the compressor, oil management units, main heat exchanger, and aftercooler. The algorithm also insures that the compressor discharge temperature does not exceed, even on a short time basis, a value (240° F.) that could significantly damage and lower the life of the compressor's lubricant oil.

EXAMPLE

Control Algorithm and System Test Results

Figure 1:
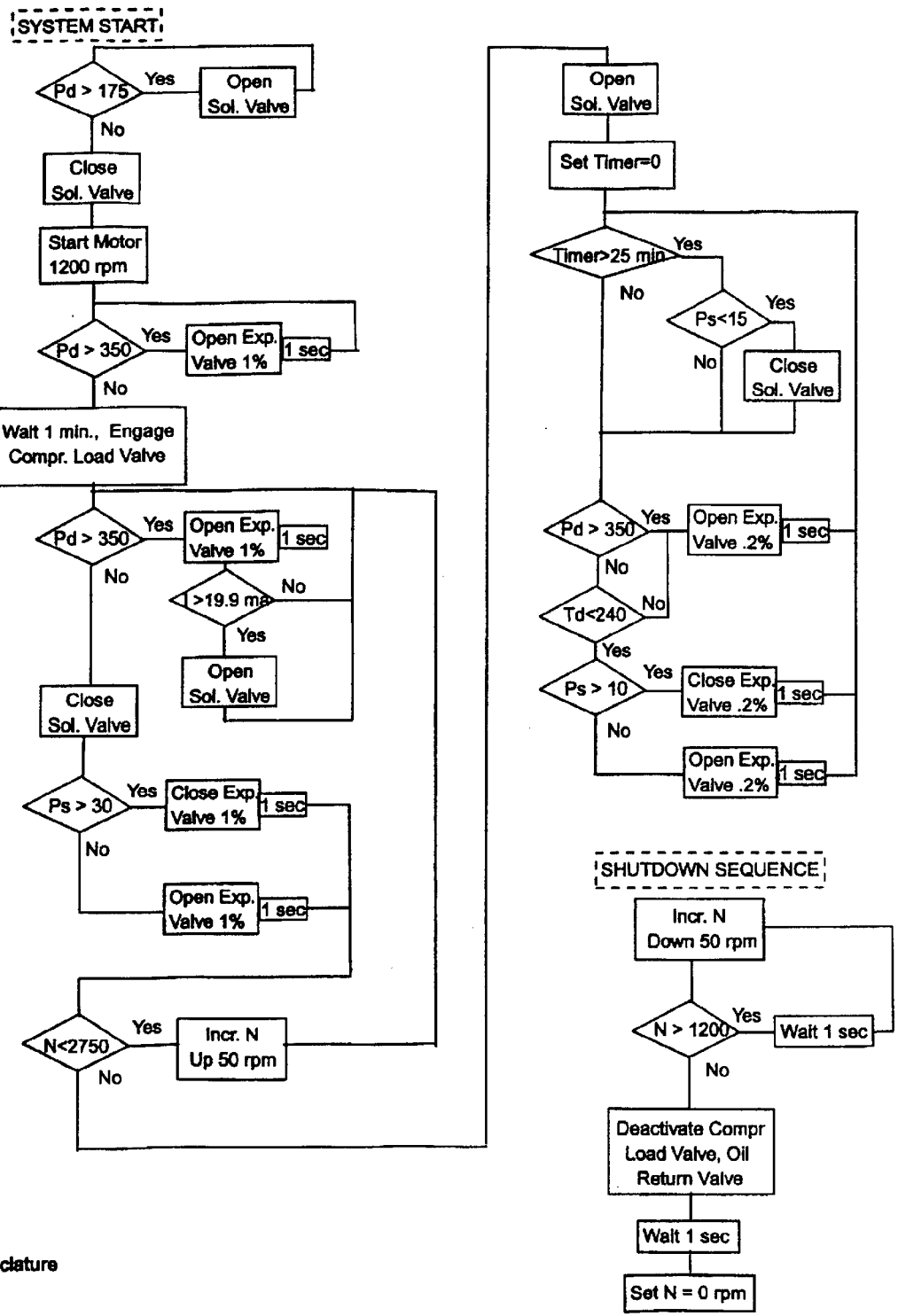
FIG. 1 is a diagram of the liquefier startup and operating control logic utilized in the method of this invention.
Figure 4:
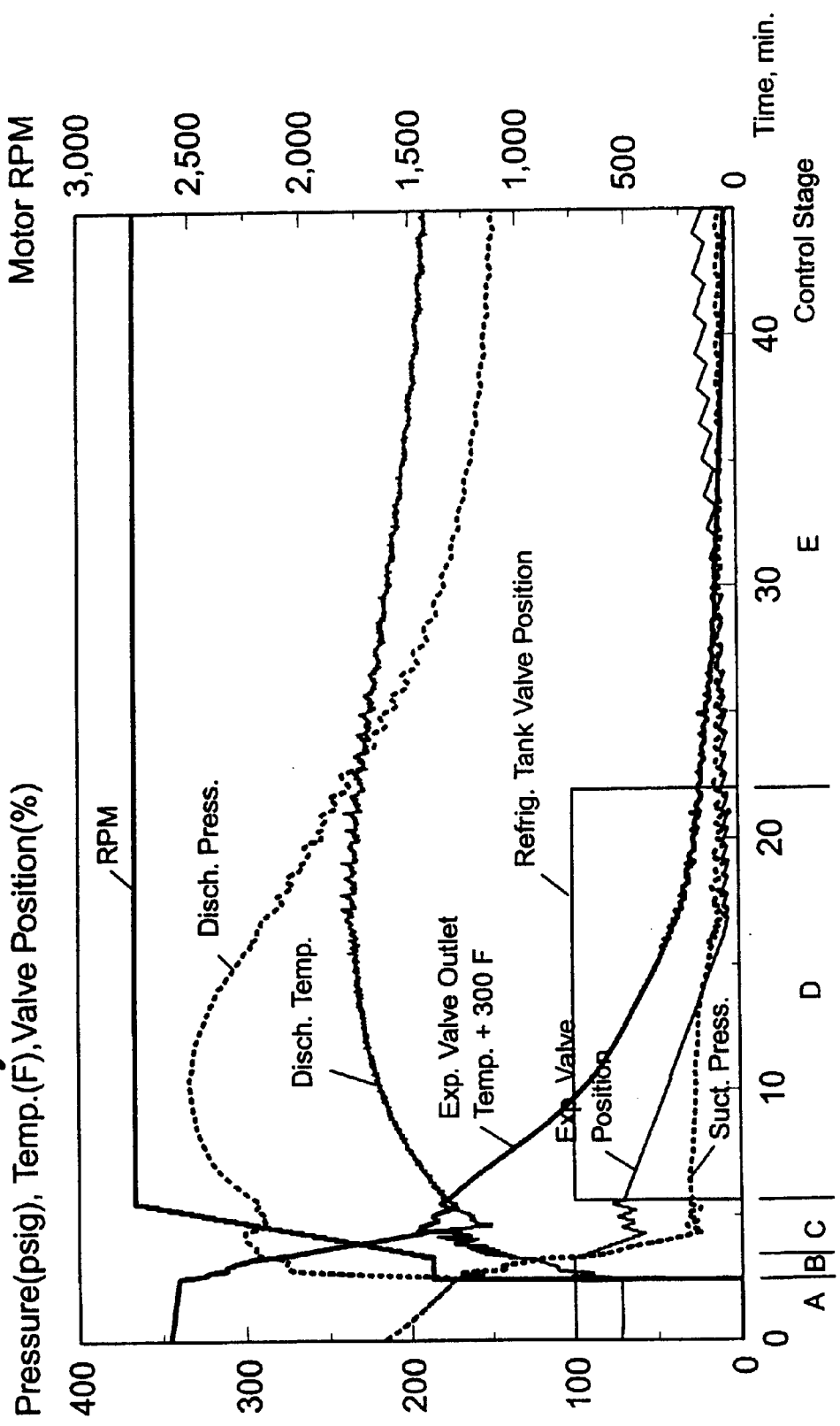
FIG. 4 is a diagram showing the results of a system pull down test conducted on the system shown in FIG. 2 using the method of this invention.

In this example, the characteristics of the developed system control, shown schematically in FIG. 1, are described together with the results of a sample pulldown test run, as shown in FIG. 4. Referring to FIG. 4, there are five stages of control, labeled on the x-axis as A, B, C, D and E.

Control Stage A

In a commercial application, the system control may enter this control stage upon manual or remote initiation of a "start" signal. The system is considered to have been in the "off" state sufficiently long (estimated at least 10 minutes), so that refrigerant system pressures throughout the unit have reasonably stabilized. After running the system, extremely cold temperatures are created in the low-pressure side of the refrigerant system, and some liquid refrigerant is formed. After stopping the system, since those cold sections of the system are well insulated, it can take 8 hours or more for some of that liquid refrigerant to vaporize and reach the pressure equilibrium corresponding to the ambient temperatures. It is, however, not necessary to wait that long for restarts, and it has been determined that after 10 minutes, sufficient pressure equilibrium may be established between the high and low pressure sides of the system to safely restart the compressor.

In Control Stage A, the control senses the system pressure, by either suction or discharge pressure transducers, and opens the solenoid valve 12 between the refrigerant in the system and the refrigerant holding tank 11, if the pressure exceeds 175 psig. The valve, labeled "Refrig. Tank Valve Position" in the pull down results shown in FIG. 4, remains open (at the 100% position) until the system pressure falls below 175 psig. As shown in FIG. 4, the initial system pressure of about 210 psig was reduced to the 175 psig level in about 2 minutes. The rate of pressure decrease in the system during this operation is dependent on the size of the valve flow passages. The solenoid valve 12 then closes, trapping the refrigerant removed from the system in the refrigerant holding tank 11, and the control continues to Control Stage B.

Control Stage B

In Control Stage B, the inverter driven electric motor 25 which directly drives the compressor is started and held at about the 1400 rpm level. After about 30 seconds, the internal solenoid valve 24 is energized, and the compressor remains at full displacement capacity for the remainder of the system "on" period. Note the rapid rise of the compressor discharge pressure, but in this case, the 350 psig limit was not obtained. High compressor discharge pressures appear during this start up phase, if the system has been in the "off" state for an hour or more and the cold sections of the system have had time to warm up and evaporate some of the condensed refrigerant. If the 350 psig pressure limit were reached, the expansion valve would be moved to a more open position via the logic shown in FIG. 1. If that expansion valve reached its maximum opening, i.e. 20 ma of current into the stepper motor drive, the valve between the refrigerant system and the refrigerant holding tank 11 would be re-opened, causing additional system refrigerant to enter the storage tank and relieve the system pressure. After about 1 minute at the 1400 rpm speed level, the system passes to Control Stage C.

Control Stage C

In Control Stage C, the compressor speed is ramped up from the starting speed of 1400 rpm, to the maximum running speed of 2750 rpm, in about 2 minutes. During this period, the suction pressure is compared to 30 psig, and if above that limit, the expansion valve is closed in 1% increments every 3 or 4 seconds. If the discharge pressure were to rise above the 350 psig level, it would increase the expansion valve opening, which has an effect on the system to reduce the discharge pressure below the 350 psig limit level. After reaching the 2750 rpm system operating speed, the system control then passes to Control Stage D.

Control Stage D

Control Stage D is involved with reintroduction of the refrigerant vapor, from the refrigerant holding tank 11 back into the system, that was removed during Control Stage A. The refrigerant solenoid valve is opened at the start of this control stage. A timer is initiated which allows for a minimum of 25 minutes for this control stage. If, after 25 minutes, the suction pressure is reduced to below 15 psig, the refrigerant solenoid valve is closed, and Control Stage D is terminated.

During this stage, because additional refrigerant is entering the system and the system may have not yet pulled completely down in temperature and reached natural gas liquefaction temperatures, the discharge pressure and temperature can once again reach or exceed their limits of 350 psig and 240° F. respectively. If either limit is reached, the expansion valve 56 is opened to increase the suction pressure, which reduces both the discharge pressure and temperature, since the pressure ratio across the compressor is reduced.

After the refrigerant solenoid valve is closed by the system logic, the control then passes to the normal running mode, Control Stage E Control Stage E In this stage, the main system control is over the compressor's suction pressure, which is to be maintained at 10 psig, via movement of the expansion valve.

After the expansion valve outlet refrigerant temperature reaches −250° F., then LNG liquefaction may be initiated by introducing 30 psig natural gas to the heat exchanger 35, via a solenoid valve as shown in the upper right hand corner of FIG. 2. Natural gas condenses at about −230° F., at a pressure of 30 psig, and the 20° F. colder temperature of the refrigerant in the bottom, or coldest section of the main heat exchanger, has been found to be needed to drive the liquefaction (or condensation) process. As shown in FIG. 4, there was no natural gas in the heat exchanger, i.e. the exchanger was essentially unloaded, and the coldest system temperature, at the expansion valve outlet, reached about −290° F.

System Shut Down

Upon initiation of a system shut down signal, originating either from a "full" LNG storage tank state, from a manual shut down button, or from a system safety related issue, the shut down sequence is implemented. Referring to FIG. 1, the compressor drive motor is incremented down 50 rpm, every second until the minimum speed, 1400 rpm is reached. Then the internal solenoid valve 24, and oil return solenoid valve 53, are de-energized, and after waiting 1 second, the input speed signal to the inverter driving the compressor motor is set to zero speed. A timer is then initiated, preventing restarts until 10 minutes of "off" time has expired.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a natural gas liquefaction system comprising a refrigerant storage means, a refrigerant circulation means in fluid communication with said refrigerant storage means, and a natural gas liquefaction means in thermal communication with said refrigerant circulation means; said refrigerant storage means comprising a refrigerant holding tank external to said refrigerant circulation means and a refrigerant solenoid valve, said refrigerant solenoid valve controlling flow of refrigerant between said refrigerant holding tank and said refrigerant circulation means; said refrigerant circulation means comprising an oil flooded screw compressor having a suction pressure port, a discharge pressure port and an internal solenoid valve connecting said suction pressure port and said discharge pressure port; a variable speed motor suitable for driving said compressor operably connected to said compressor; an oil separator having a discharge gas inlet in fluid communication with said discharge pressure port, a separated oil outlet in fluid communication with an oil inlet of said compressor, and a separated gas outlet; a high pressure heat exchanger having a separated gas inlet in fluid communication with said separated gas outlet and said liquid refrigerant storage means; and said natural gas liquefaction means comprising a multi-circuit heat exchanger having a natural gas liquefier circuit and a refrigerant circuit, an expansion valve disposed in said refrigerant circuit and a liquid natural gas tank in fluid communication with said refrigerant circuit, a method for controlling a cycle of said system having a start phase, a run phase and a shutdown phase comprising the steps of:

initiating a start signal whereby said refrigerant solenoid valve is operated to provide an initial pressure in said refrigerant circulation means below about 175 psig;

initiating operation of said variable speed motor whereby operation of said compressor is initiated;

energizing said internal solenoid valve whereby said compressor is operated at full discharge capacity;

initiating operation of said expansion valve whereby suction pressure at said suction pressure port is maintained below about 30 psig and discharge pressure at said discharge pressure port is maintained below about 350 psig;

introducing refrigerant vapor from said refrigerant holding tank into said refrigerant circulation means until said suction pressure is reduced to below about 15 psig after which flow of said refrigerant vapor from said refrigerant holding tank is terminated; and introducing natural gas into said natural gas liquefier, resulting in liquefaction of said natural gas.

2. A method in accordance with claim 1, wherein a system shutdown signal is generated by one of a full said liquefied natural gas tank, a manual shutdown means and a system safety device resulting in reducing the speed of said variable speed motor and de-energizing of said internal solenoid valve and an oil return solenoid valve by which oil is returned from said oil separator to said compressor.

3. A method in accordance with claim 2, wherein restarting of said system is prevented until expiration of a predetermined time period by a timer.

4. A method in accordance with claim 1, wherein said refrigerant is a mixed refrigerant.

5. A method in accordance with claim 4, wherein said mixed refrigerant comprises nitrogen, methane, ethane, iso-butane and iso-pentane.

* * * * *